(12) United States Patent
Michaels

(10) Patent No.: US 6,466,588 B1
(45) Date of Patent: Oct. 15, 2002

(54) APPARATUS FOR FACILITATING COMBINED POTS AND XDSL SERVICES AT A CUSTOMER PREMISES

(75) Inventor: Jim Michaels, Oceanport, NJ (US)

(73) Assignee: GlobespanVirata, Inc., Red Bank, NJ (US)

(*) Notice: Subject to any disclaimer, the term of this patent is extended or adjusted under 35 U.S.C. 154(b) by 0 days.

(21) Appl. No.: 09/156,158

(22) Filed: Sep. 17, 1998

Related U.S. Application Data

(60) Provisional application No. 60/059,669, filed on Sep. 18, 1997.

(51) Int. Cl.$^7$ .................................................. H04J 15/00
(52) U.S. Cl. ..................... 370/493; 379/399.01; 375/220
(58) Field of Search ................................. 375/210, 203, 375/480, 481, 484, 487, 222, 220; 455/103; 370/464, 493; 379/399.01

(56) References Cited

U.S. PATENT DOCUMENTS

| | | | | |
|---|---|---|---|---|
| 4,860,308 A | * | 8/1989 | Kamerman et al. | 375/8 |
| 5,507,033 A | * | 4/1996 | Dolan | 455/33.1 |
| 5,757,803 A | * | 5/1998 | Russell et al. | 370/494 |
| 5,848,150 A | * | 12/1998 | Bingel | 379/399 |
| 5,889,856 A | * | 3/1999 | O'Toole et al. | 379/399 |
| 5,910,970 A | * | 6/1999 | Lu | 375/377 |
| 5,930,340 A | * | 7/1999 | Bell | 379/93.08 |
| 6,061,392 A | * | 5/2000 | Bremer et al. | 375/222 |
| 6,104,236 A | * | 8/2000 | Tsinker | 327/557 |
| 6,130,916 A | * | 10/2000 | Thomson | 375/285 |
| 6,144,659 A | * | 11/2000 | Nye et al. | 370/359 |
| 6,236,664 B1 | * | 5/2001 | Erreygers | 370/492 |
| 6,252,900 B1 | * | 6/2001 | Liu et al. | 375/219 |

* cited by examiner

Primary Examiner—Ricky Ngo
Assistant Examiner—Tri Phan
(74) Attorney, Agent, or Firm—Thomas, Kayden, Horstemeyer & Risley

(57) ABSTRACT

In accordance with one aspect of the invention, an apparatus is provided for facilitating combined xDSL and POTS communication across a two wire pair. The apparatus includes a first communication port for communication with a central office across a two wire pair, and a second communication port for communication with a customer premises across a two wire pair. A splitter, or tap, is disposed at the first communication port for splitting a combined xDSL and POTS signal into a first and second signal path. A low pass filter is disposed in the first signal path for filtering the xDSL signal from the combined signal in the first signal path, leaving only the low-frequency (POTS frequency) signals. A circuit is disposed in the second signal path that is configured to filter the POTS signal from the combined signal, leaving only the xDSL signal. The circuit is further configured to terminate the xDSL signal and regenerate it at a lower amplitude and higher frequency than the original xDSL signal of the combined signal. Finally, an adder is configured to combine the POTS signal on the first path with the regenerated xDSL signal on the second path, and output the result to the second communication port (for entry into the customer premises).

6 Claims, 5 Drawing Sheets

APPARATUS FOR FACILITATING COMBINED POTS AND XDSL SERVICES AT A CUSTOMER PREMISES

CROSS-REFERENCE TO RELATED APPLICATIONS

This application claims the benefit of U.S. Provisional Application Ser. No. 60/059,669, filed Sep. 18, 1997, and entitled Apparatus For Facilitating Combined Pots And xDSL Services At A Customer Premises.

BACKGROUND OF THE INVENTION

1. Field of the Invention

The present invention generally relates to combined plain old telephone systems (POTS) transmissions and digital subscriber line (DSL) transmissions, and more particularly to an apparatus for providing combined POTS and DSL transmissions to a customer premises, while eliminating the need for duplicative POTS filters or the need to undertake extensive premises rewiring.

2. Discussion of the Related Art

Prompted largely by the growth in Internet usage, the provision of xDSL services to customer premises has proliferated over recent years. In this regard, the descriptor "x" preceding the DSL designator is used to broadly denote a variety of DSL services, including ADSL, RADSL, HDSL, etc. As is known, xDSL transmissions are sent to customer premises over the same twisted pair cabling as POTS transmission are sent. Since xDSL transmissions are communicated in a frequency band that is separate and distinct from the POTS frequency band, transmitting both types of signals over the same cabling (even at the same time), generally is not a problem. Specifically, the POTS frequency band is defined between approximately DC and approximately 4 kHz, while xDSL frequency bands (although they vary depending upon the specific service) are generally defined by a lower cutoff frequency of approximately 30 kHz, and an upper cutoff frequency that depends upon the particular xDSL service.

However, it is known that some measure of additional protection is generally necessary, when the communications occur simultaneously. In this regard, a person speaking into a telephone handset will generally observe audible noise over the handset, even though the xDSL signals are at frequencies above the audible range. It has been generally determined that this audible noise is a result of circuit components within a telephone handset reacting with the xDSL signals to generate lower frequency noise signals, also called intermodulation products. Therefore, some level of additional protection must be provided in order to satisfactorily transmit both POTS information and xDSL signals at the same time.

This additional protection is usually provided by placing a POTS filter at the customer premises. As the name suggests, a POTS filter is a low pass filter that rejects signals at frequencies higher than the POTS frequency band (thus filtering the POTS band signals). Likewise, most xDSL equipment includes a front-end high-pass filter to reject lower frequency POTS signals (as POTS signals tend to distort the xDSL signals by clipping at the analog to digital converter). In this way, xDSL signals are isolated from the POTS signals, which can then be individually routed to the appropriate locations at the customer premises. There are, however, at least two specific manners in which the POTS filter is provided at the customer premises.

First, the local loop is often tapped at the point of entry into the customer premises, and the POTS filter placed at the point of entry. The output of the POTS filter can then be electrically connected to the wiring entering the premises so that all jacks within the premises receive the protection of the POTS filter. Unfortunately, since dual lines are generally not prewired at a customer premises, the second line carrying the xDSL signals must be routed into the customer premises (which may require drilling through walls or other measures). Sometimes this does not pose a significant problem, particularly when the xDSL line need only be routed to a single location that is relative easy to route the line. However, if access to the xDSL service is desired at multiple locations within the customer premises, then the routing of the signal lines will become more tedious, time consuming, and expensive.

A second, relatively simple solution to implement is to simply provide a POTS filter at every location within the customer premises supporting POTS equipment (e.g., telephones, facsimile machines, PSTN modems, etc.). This filter may be provided in a single housing that simply plugs into the jacks (e.g. RJ-11 jack). Thus, such a filter will need to be provided for every telephone used in the premises. While simple to implement, this solution certainly imposes a significant cost burden on the customer.

Accordingly, an alternative solution that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus that is placed, preferably, at or near the point of entry (or the local loop) of a customer premises. The apparatus operates to do two things. First, it taps off the local loop and passes the tap through a POTS filter. The remainder, which carries the xDSL signal transmissions, is filtered to remove signals within the POTS frequency band and is then frequency shifted upwardly. In addition, the power level of the xDSL transmissions is reduced. In practice, the xDSL signal is terminated at the point of entry of the customer premises, then regenerated at a higher frequency and transmitted at a lower power. Then the tapped signal (which has been passed through the POTS filter) is recombined with the frequency shifted signal, and delivered to the customer premises. In this way, the single line that is routed throughout the customer premises to a plurality of jacks supports both POTS and xDSL transmissions, and no additional filtering need be done.

In accordance with one aspect of the invention, an apparatus is provided for facilitating combined xDSL and POTS communication across a two wire pair. The apparatus includes a first communication port for communication with a central office across a two wire pair, and a second communication port for communication with a customer premises across a two wire pair. A splitter, or tap, is disposed at the first communication port for splitting a combined xDSL and POTS signal into a first and second signal path. A low pass filter is disposed in the first signal path for filtering the xDSL signal from the combined signal in the first signal path, leaving only the low-frequency (POTS frequency) signals. A circuit is disposed in the second signal path that is configured to filter the POTS signal from the combined signal, leaving only the xDSL signal. The circuit is further configured to terminate the xDSL signal and regenerate it at a lower amplitude and higher frequency than the original xDSL signal of the combined signal. Finally, an adder is configured to combine the POTS signal on the first path with the regenerated xDSL signal on the second path, and output the result to the second communication port (for entry into the customer premises).

In accordance with another aspect of the present invention, a method is provided for facilitating combined xDSL and POTS communication across a two wire pair and into a customer premises. In accordance with this aspect of the invention, the method includes the primary steps of receiving a combined signal from a central office, the combined signal having both POTS and xDSL signals, transforming the xDSL signal by shifting it upward in frequency and reducing its amplitude, and directing the transformed signal into the customer premises.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF PREFERRED EMBODIMENT

Figure 1:
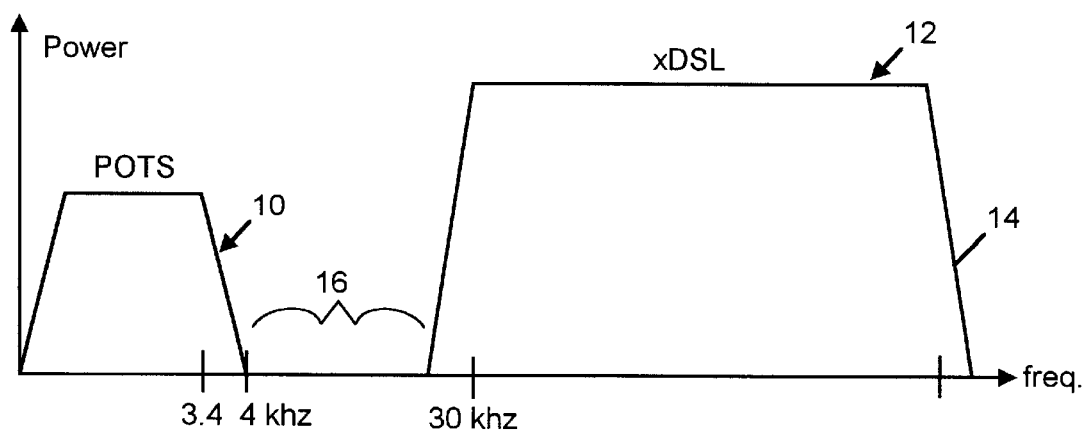
FIG. 1 is a graph showing the power spectrum for POTS and xDSL transmission bands.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention.

Turning now to the drawings, FIG. 1 shows the spectrum allocation for both POTS and xDSL signals. Specifically, the graph is a plot of frequency on the horizontal axis and power on the vertical axis. As is known, the POTS frequency band 10 generally extends from approximately 300 hertz to approximately 3.4 kilohertz. The xDSL frequency band 12 generally extends from approximately 30 kilohertz up to an upper boundary 14, which varies depending upon the particular digital subscriber line technology utilized. A separation or guard band 16 provides some margin of signal separation, and thus noise and cross-talk immunity between signal transmissions between the POTS 10 and xDSL 12 frequency bands.

Figure 2:
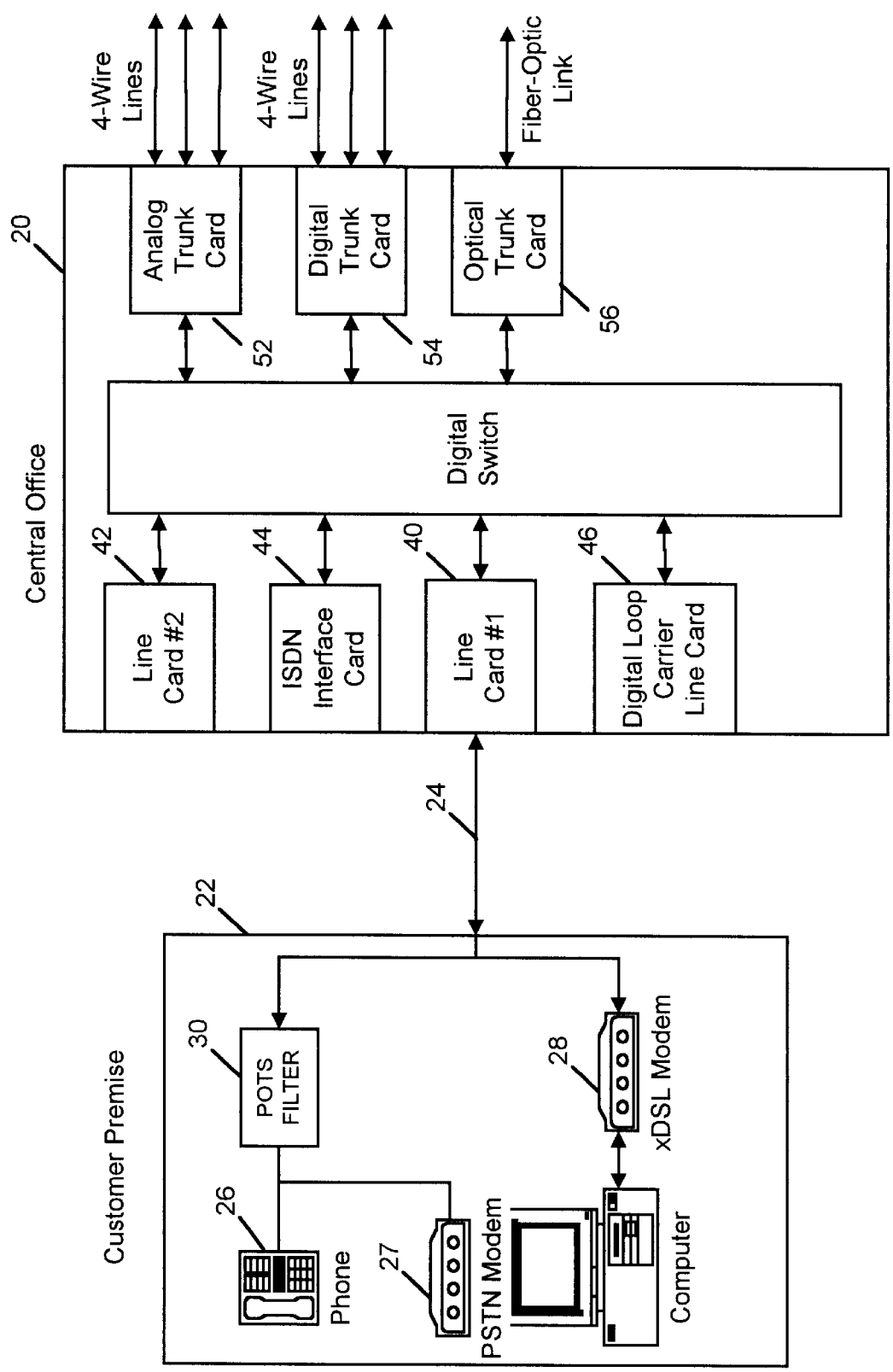
FIG. 2 is a block diagram illustrating the principal components of a prior art telecommunication system, at both the central office and customer premises.

Referring now to FIG. 2, a prior art communication system is shown. Specifically, FIG. 2 illustrates communication between a central office 20 and a customer premises 22 by way of local loop 24. While the customer premises 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, a POTS filter 30 is interposed between the POTS equipment 26 and the local loop 24. As is known, the POTS filter 30 includes a low-pass filter having a cut-off frequency of approximately 4 kilohertz to 10 kilohertz, in order to filter high frequency transmissions from the xDSL communication device 28 and protect the POTS equipment.

At the central office 20, additional circuitry is provided. Generally, a line card 40 containing line interface circuitry is provided for electrical connection to the local loop 24. In fact, multiple line cards may be provided 40, 42 to serve a plurality of local loops. In the same way, additional circuit cards are typically provided at the central office 20 to handle different types of services. For example, an ISDN interface card 44, a digital loop carrier line card 46, and other circuits cards, for supporting similar and other communication services, may be provided.

A digital switch 50 is also provided at the central office 20 and is disposed for communication with each of the various line cards 40, 42, 44, 46. On the outgoing side of the central office (i.e., the side opposite the various local loops), a plurality of trunk cards 52, 54, 56 are typically provided. For example, an analog trunk card 52, a digital trunk card 54, and an optical trunk card 56 are all illustrated in FIG. 2. Typically, these cards have outgoing lines that support numerous multiplexed transmissions and are typically destined for other central offices or long distance toll offices.

Figure 3:
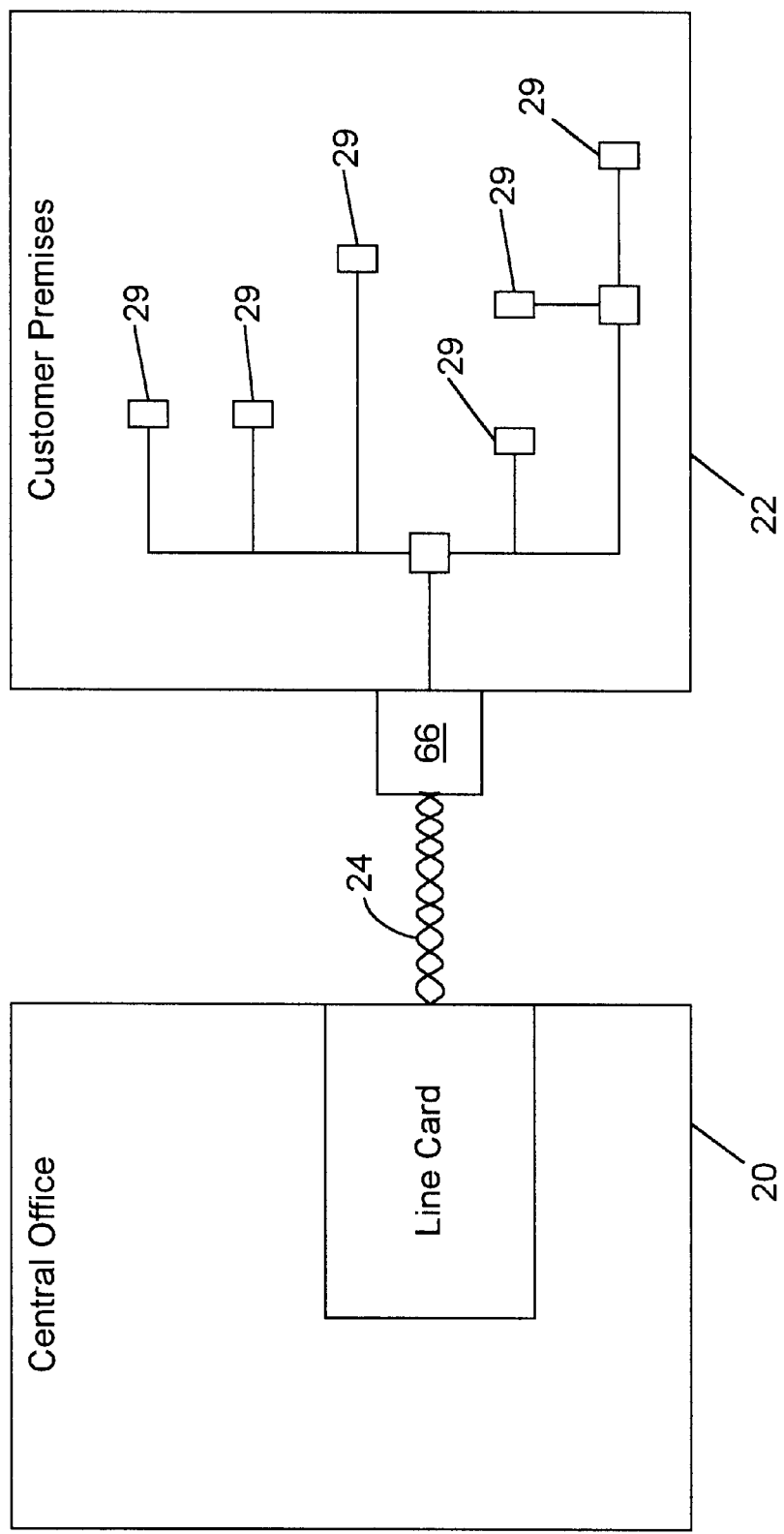
FIG. 3 is a block diagram illustrating the primary components of a system constructed in accordance with the invention.

Having described a very basic layout of the central office architecture, reference is now made to FIG. 3, which is a system level block diagram is presented. Specifically, the diagram illustrates communication between a central office 20 and a single customer premises 22 across a single twisted pair wire, referred to as the local loop 24. It will be appreciated, however, that the communication with the customer premises need not come directly from the central office 20, but may instead may come from a repeater or other intermediate device. At the customer premises 22, the two wire signal line enters the customer premises and is routed throughout to a number of jacks 29 (e.g., RJ-11 jacks).

Figure 4:
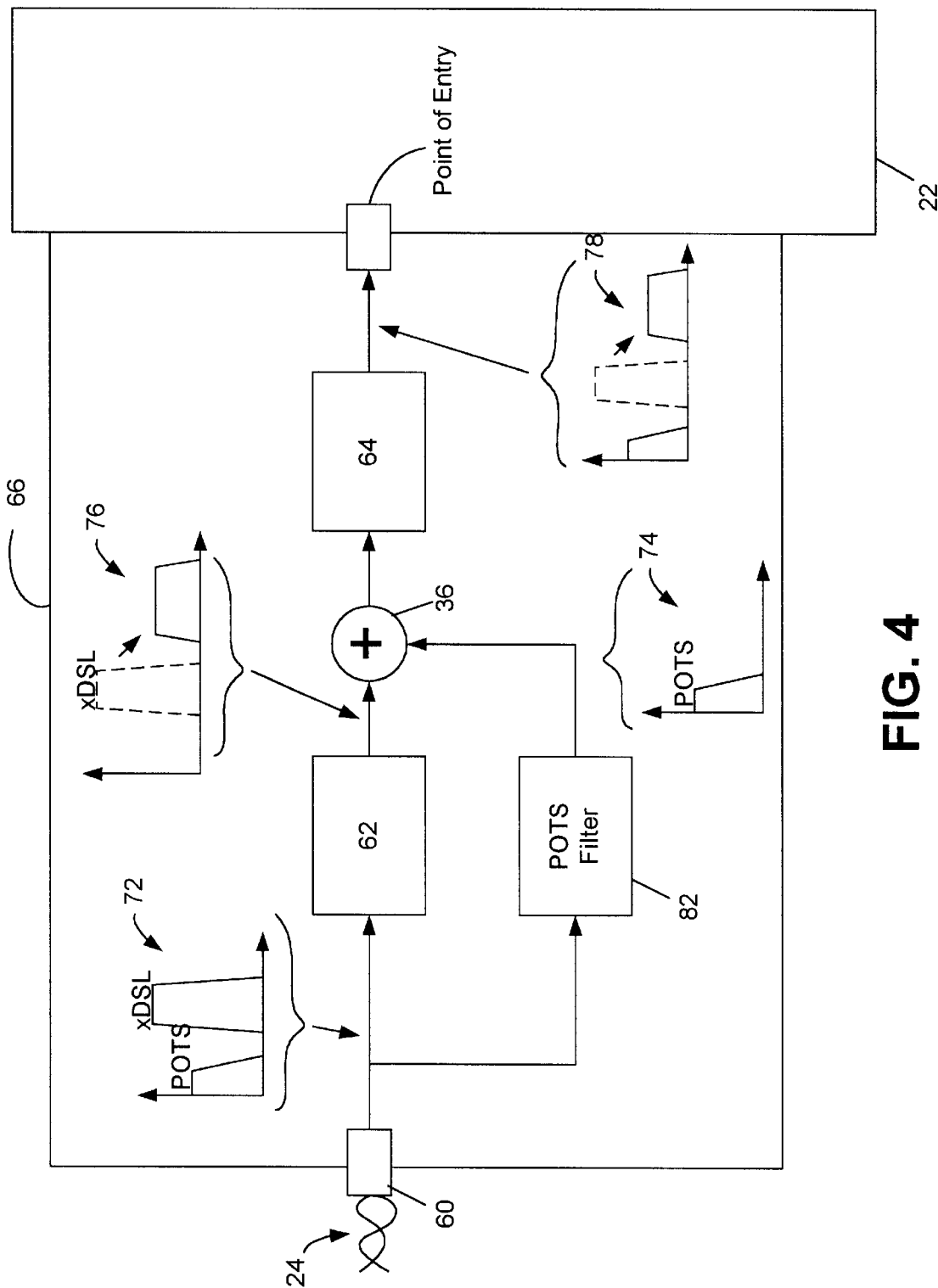
FIG. 4 is a block diagram of a device embodying the inventive concepts of the present invention.

A device 66 constructed in accordance with the concepts and teachings presented herein is provided at the line entry point of the premises. Reference is now made to FIG. 4, which is a block diagram of the device 66. As shown, near the entry of the device, the local loop is split, or tapped, at 60 into two paths. A first path is routed through a POTS filter 82 which operates to reject all signals have frequencies outside the POTS frequency band of approximately DC to approximately 4 kHz. The second path is routed through a circuit 62 that operates to upwardly shift the xDSL signals. In accordance with one implementation, this operation may be performed by a digital signal processor 62 performing what is sometimes referred to as a "frequency fold." As the name implies, the frequency fold simply folds the xDSL signals about a reference frequency located near the upper end of the xDSL frequency band. Recognizing that the device 66 will also need to provide its own internal transmitter (thus acting in part like a repeater—see FIG. 5), the folded signal is then passed to the transmitter 64 that transmits the signal at a reduced power to the output.

It will be appreciated, however, that the invention is not limited to this "frequency fold" embodiment. Indeed, consistent with the concepts and teaching of the invention, the circuit 62 that converts the incoming xDSL signal to a higher frequency xDSL signal may convert between alternative modulation schemes as well. In this regard, the broad inventive concepts are not limited to any given modulation scheme.

As shown, an adder 36 (or modulator) is provided near the output of the device 66, and operates to combine the POTS (filtered) signal back into the folded (or otherwise converted) signal. The resultant signal is delivered to the entry point of the customer premises 22.

It will be appreciated by those skilled in the art that the two measures recited above both lend added immunity to the noise problem of the prior art. Specifically, upwardly shifting the xDSL signals provides a greater guard band between the POTS signals and the xDSL signals, thereby reducing the probability for noise interference from the xDSL signals into the POTS band. In the same way, reducing the transmission power of the xDSL signal provides added noise immunity from xDSL signal noise entering the POTS frequency band. Although both of these measures will be implemented in the preferred embodiment, it will be appreciated that either measure practiced alone may be sufficient to realize the benefits of the present invention.

In this regard, the home wiring does not form part of the local loop. Therefore, the noise within the premises is reduced. That is, the separation provided by the device 66 increases the noise immunity within the home/customer premises.

It will be further appreciated that the transmitter 64 may transmit the output at a much reduced power since the signal need not travel that far. Specifically, the signal need only travel the distance of the wiring within the customer premises (generally less than 200 feet). Whereas, the distance traveled across the local loop may be some 12,000 feet, which requires much greater signal amplitude. For this same reason, the xDSL signals may be upwardly shifted in frequency.

Graphs 72, 74, 76, and 78 illustrate the signals that are carried on signal paths at various points within the device 66. More particularly, graph 72 illustrates that the combined signal entering the device 66 includes both POTS and xDSL components. After entry into the device 66, the combined signal is directed into two paths 79 and 80. A POTS filter 82 is disposed in the second path, and acts to filter out the high frequency xDSL signal. Thus, the signal output from the POTS filter 82 appears as shown in graph 74. Similarly, a DSP 62 is disposed in the first signal path and is programmed to operate to first filter out the low frequency POTS signals, then perform a frequency fold operation on the higher frequency xDSL signals. In this regard, the xDSL signals are upwardly shifted. Thus the signal output from the DSP 62 appears as shown in graph 76, wherein the dashed line represents the original xDSL signal, and the solid line represents the frequency shifted xDSL signal.

Thereafter, the signals carried on the first and second signal paths 79 and 80 are added by adder 36, then passed through a transmitter 64 for transmission into the customer premises 22. In the illustrated embodiment, the DSP 62 may attenuate the amplitude of the xDSL signal. Alternatively, the transmitter 64 may be configured to attenuate the signal levels transmitted into the customer premises.

Figure 5:
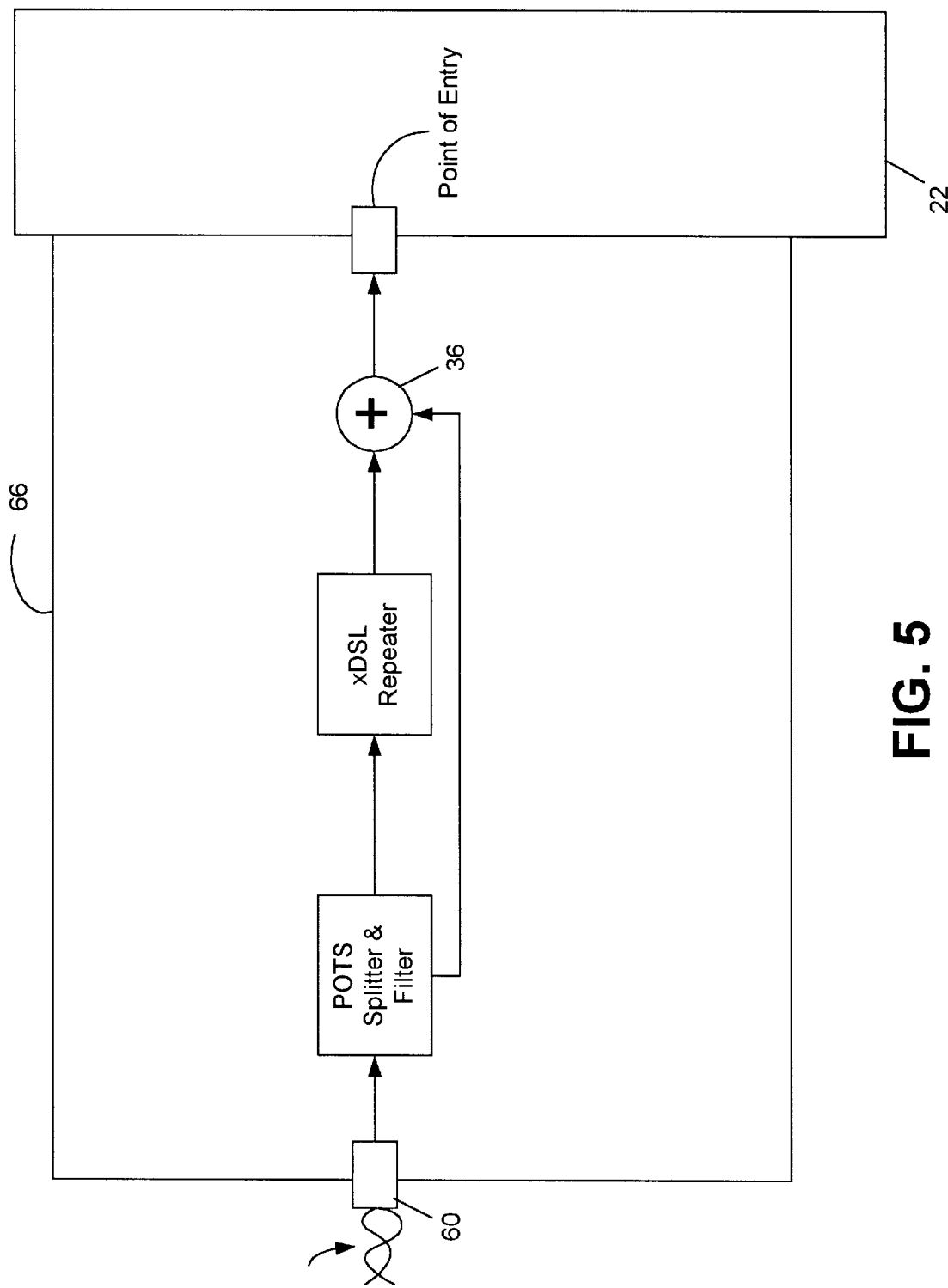
FIG. 5 is a block diagram of a device also embodying the inventive concepts of the present invention.

FIG. 5 illustrates a slightly different depiction of the apparatus 66, emphasizing the notion concept that the xDSL signal is terminated and regenerated before it is routed into a customer premises also improves the performance, since the intra-premises routing of the xDSL signal is generally accomplished by adding a significant number of bridge taps, utilizes untwisted pair cabling, and is subject to other sources of noise, such as florescent lights, dimmers, etc. Terminating and regenerating the xDSL signal in the higher frequency band reduces the effect of these added sources of noise. Furthermore, the relatively short span of wiring in the customer premises allows the xDSL signal to be regenerated at a much lower power level.

As a result of the present invention, both xDSL signals and POTS signals are delivered to every jack 29 prewired at the customer premises 22 to the local loop 24. Thus, POTS telephones, facsimile machines, PSTN modems, or xDSL modems may be plugged directly into any of the prewired RJ-11 jacks. No further filtering or signal processing need be performed.

Certainly, it will be appreciated that the system of the present invention embodies certain benefits over and tradeoffs with the approaches known in the prior art. One tradeoff is that the solution may be more expensive than simply employing a simple (passive) POTS filter at the entry point of the customer premises, and routing a single wire (or two) to a jack for xDSL connection. However, the system of the present invention provides much greater flexibility and expandability, as more and more devices (e.g., televisions) are utilizing xDSL services.

As will be appreciated by those skilled in the art, other benefits of the present invention include the ability to have a local area network in the customer premises. In this regard, the device 66 serves as a gateway to such local area network. Furthermore the invention provides additional testing capability to the service provider, by isolating the local loop from the premises wiring. Thus, the device 66 could support loop-back or other known types of testing.

Although not shown in the drawing, it will be appreciated that reciprocal circuitry will be provided for transmissions originating from the customer premises 22 and directed to the central office 20.

Although the foregoing has been described in connection with a receive functionality of the device 66, it will be appreciated that the device 66 may also include similar components to operate upon a combined signal being transmitted from the customer premises 22 to a central office 20. For example, the outgoing signal may be processed by increasing the amplitude of the xDSL signal and downwardly shifting it in frequency. Of course, the operations on the outgoing signal may vary depending on the operation of the modems or other devices provided within the customer premises.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated.

What is claimed is:

1. An apparatus disposed at a point of entry of a customer premises for facilitating combined xDSL and POTS communication across a two wire pair comprising:

a first communication port for communication with a central office across a two wire pair;

a second communication port for communication with the customer premises across a two wire pair;

a tap disposed at the first communication port for splitting a combined xDSL and POTS signal into a first and second signal path;

a low pass filter disposed in the first signal path for filtering the xDSL signal from the combined signal in the first signal path;

a circuit disposed in the second signal path, the circuit configured to filter the POTS signal from the combined signal, the circuit further configured to regenerate the xDSL signal, such that the regenerated xDSL signal is transmitted at a lower amplitude and higher frequency than the original xDSL signal of the combined signal; and an adder configured to combine the POTS signal on the first path with the regenerated xDSL signal on the second path, the adder having an output disposed in communication with the second communication port.

2. The apparatus as defined in claim 1, wherein xDSL signal is communicated in accordance with a first modulation scheme, and the regenerated xDSL signal is communicated in accordance with a second modulation scheme.

3. The apparatus as defined in claim 1, wherein the circuit is a programmable circuit.

4. The apparatus as defined in claim 3, wherein the programmable circuit is a digital signal processing chip.

5. The apparatus as defined in claim 1, wherein the circuit is configured to perform a frequency-fold of the xDSL signals on the second signal path.

6. The apparatus as defined in claim 1, wherein the two wire pair is a twisted wire pair.

* * * * *